Aug. 2, 1927.

A. CLERET 1,637,684

SIGNALING APPARATUS FOR ROAD TRAFFIC

Filed Sept. 7, 1926

A. Cleret
inventor

By: Marks & Clerk
Attys.

Patented Aug. 2, 1927.

1,637,684

UNITED STATES PATENT OFFICE.

ALBERT CLÉRET, OF PARIS, FRANCE.

SIGNALING APPARATUS FOR ROAD TRAFFIC.

Application filed September 7, 1926, Serial No. 134,042, and in France September 15, 1925.

This invention relates to road vehicle signals of the type operated non-automatically, i. e., by the driver of the vehicle at the instant when he proposes to make a stop or change of direction which might constitute an obstacle or a danger for other vehicles. The apparatus comprises a disc or shutter which can be turned from an edge view to a face view, when a signal is to be given and to which rotary motion is imparted by the current of air set up by the movement of the vehicle.

Figure 1:
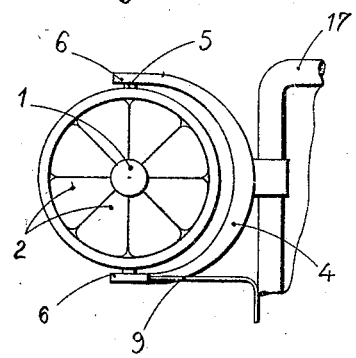
Figure 2:
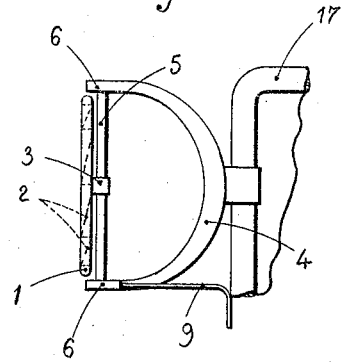
Figure 3:
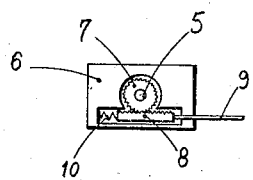

In the accompanying drawings Fig. 1 shows the apparatus in its signaling position with the disc in a plane at right angles to the direction of travel. Fig. 2 shows the apparatus in the non-signaling position, i. e., parallel with the direction of travel. Fig. 3 shows a detail of the rack motion for operating the apparatus.

Figure 4:
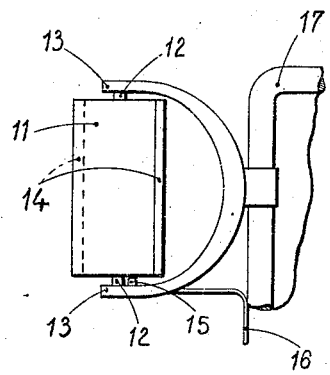
Figure 5:
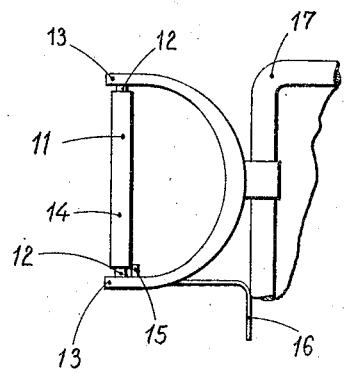

Fig. 4 shows a modification of the apparatus when in the signaling position and Fig. 5 when in the non-signaling position.

The apparatus comprises a disc 1 which by way of example is shown circular in Fig. 1, provided with vanes 2, the plane of each vane being inclined with respect to the plane of the disc. The disc is carried by a sleeve 3 attached to a shaft 5 which is supported at its ends in bearings 6 in the arms of a fork 4. This fork may be attached preferably to the frame 17 of the wind-screen. At its lower part the shaft 5 has attached to it a toothed wheel 7 which receives motion from a rack 8 (Fig. 3). A flexible shaft or Bowden wire 9 is operated by the driver and causes the rack 8 to move against the opposing spring 10, which brings back the rack 8 into its normal position.

The operation of the apparatus is as follows: The disc 1 is held normally by the spring of the rack 8 immovable in a plane parallel to the direction of travel. When the driver operates the flexible shaft 9, the rack 8 by compressing the re-setting spring 10 brings the disc into a plane at right angles to the direction of travel, the current of air set up by the travel then acts on the vanes 2 and the disc 1 is set in rotation and thus constitutes a signal, which draws attention. The vanes may be constituted by a bright or coloured substance which renders the signal very visible and which glitters at night under the light from the lamps of vehicles which are following or are going to turn. When the vehicle is at rest, the apparatus is operated by the wind, or may become merely a simple stationary disc.

In the modification shown in Figs. 4 and 5 there is provided a rectangular shutter 11 which is attached by its major axis to a rod 12 the ends of which are carried in bearings 13 so that this shutter can rotate about its vertical axis. The shutter 11 is provided at any place with small vanes or alternatively with flanges 14 and is locked by the action of a spring 15 in a plane parallel with the direction of travel. The action of a flexible shaft 16 acting on the spring 15 can unlock the apparatus which is then turned into the face view position and rotates under the action of the current of air set up by the motion of the vehicle.

Claims:

1. A road vehicle signal of the character described, including in combination a supporting bracket, a shaft journalled therein, a sleeve carried by the shaft medially of the ends thereof, a disc composed of a plurality of vanes rotatably mounted on the sleeve, and means operable from a point adjacent the driver of the vehicle for partially rotating the shaft so as to move the disc in a position to face the current of air set up by the movement of the vehicle, to effect rotation of the disc substantially as and for the purposes set forth.

2. An arrangement as claimed in claim 1, wherein the bracket consists of spaced arms positioned transversely of the vehicle so that the disc when idle lies parallel to the direction assumed by the vehicle and when operative lies transversely of the direction of travel.

3. A road vehicle signal as claimed in claim 1, wherein the vanes of the disc are provided with a bright colored substance to increase the visibility of the same and to cause them to glitter at night under the lamps of vehicles following the approaching of the vehicle on which the signal is connected.

4. A road vehicle signal of the character described, including in combination a supporting bracket, a rectangular shutter journalled in said bracket and provided with flanges at their longitudinal edges thereof, means operable from a point adjacent the driver of the vehicle for normally holding the shutter in a position parallel to the direction of travel of the vehicle and adapted when operated to release the shutter in order that a current of air set up by the movement of the vehicle will act on the flanges to rotate the shutter.

In testimony whereof I affix my signature.

ALBERT CLÉRET.